United States Patent
Kalofonos et al.

(10) Patent No.: US 7,764,981 B2
(45) Date of Patent: Jul. 27, 2010

(54) SYSTEM AND METHOD FOR MANAGING A WIRELESS CONNECTION TO REDUCE POWER CONSUMPTION OF A MOBILE TERMINAL

(75) Inventors: Dimitris Kalofonos, Cambridge, MA (US); Mika Saaranen, Pirkkala (FI); Vlad Stirbu, Tampere (FI); Cathy Chan, Burlington, MA (US)

(73) Assignee: Nokia Corporation, Espoo (FI)

( * ) Notice: Subject to any disclaimer, the term of this patent is extended or adjusted under 35 U.S.C. 154(b) by 994 days.

(21) Appl. No.: 11/190,663

(22) Filed: Jul. 27, 2005

(65) Prior Publication Data

US 2006/0025181 A1 Feb. 2, 2006

Related U.S. Application Data

(60) Provisional application No. 60/592,874, filed on Jul. 30, 2004.

(51) Int. Cl.
 *H04B 1/38* (2006.01)
 *H04W 4/00* (2009.01)
 *H04L 12/26* (2006.01)

(52) U.S. Cl. .................. 455/574; 455/572; 370/235; 370/338

(58) Field of Classification Search ............... 455/41.1, 455/41.2, 572, 574, 453, 67.11, 515, 550.1, 455/522, 561, 517, 426.1, 432.3; 370/311, 370/338, 230, 231, 230.1, 235, 236, 318, 370/328

See application file for complete search history.

(56) References Cited

U.S. PATENT DOCUMENTS 6,795,688 B1 9/2004 Plasson et al.
6,917,598 B1 * 7/2005 Emeott et al. ............... 370/311
6,961,311 B2 * 11/2005 Rakotoarivelo et al. ..... 370/238

(Continued)

FOREIGN PATENT DOCUMENTS

EP 0 722 231 A1 7/1996

(Continued)

OTHER PUBLICATIONS

Ho Young Hwang, Sun Jong Kwon, Yun Won Chung, Dan Keun Sung; *A Mobility Management Scheme for Reducing Power Consumption in IP-Based Wireless Networks*; 2002; pp. 2979-2983; IEEE.

(Continued)

*Primary Examiner*—George Eng
*Assistant Examiner*—Brandon J Miller
(74) *Attorney, Agent, or Firm*—Alston & Bird LLP

(57) ABSTRACT

A mobile terminal includes a processor capable of operating a link manager. The link manager is capable of at least partially operating a wireless connection between the terminal and an access point in an active mode, where the access point is coupled to a network. The link manager is also capable of transitioning the connection from the active mode to a standby mode or hibernate mode. In this regard, transitioning the connection includes entering the mobile terminal in a power-saving mode of a bearer of the connection, such as a Bluetooth power-saving mode, and directing the access point to reduce traffic flowing from the network across the connection to the mobile terminal when the mobile terminal is otherwise capable of receiving the traffic.

48 Claims, 8 Drawing Sheets

U.S. PATENT DOCUMENTS

| | | | | |
|---|---|---|---|---|
| 6,973,052 | B2 * | 12/2005 | Wang et al. | 370/278 |
| 7,092,732 | B2 * | 8/2006 | Tamaki et al. | 455/522 |
| 7,110,783 | B2 * | 9/2006 | Bahl et al. | 455/516 |
| 7,133,944 | B2 * | 11/2006 | Song et al. | 710/100 |
| 7,356,014 | B2 * | 4/2008 | Park et al. | 370/338 |
| 2002/0132603 | A1 * | 9/2002 | Lindskog et al. | 455/343 |
| 2004/0192325 | A1 * | 9/2004 | Backes et al. | 455/453 |
| 2005/0075084 | A1 | 4/2005 | Salokannel et al. | |
| 2005/0107134 | A1 * | 5/2005 | Morioka et al. | 455/574 |
| 2005/0249227 | A1 * | 11/2005 | Wang et al. | 370/412 |

FOREIGN PATENT DOCUMENTS

| | | |
|---|---|---|
| EP | 0 722 231 B1 | 7/1996 |

OTHER PUBLICATIONS

*RemoteUIClientDevice: 1 Device Template Version 1.01*—For UPnP™ Version 1.0; Standardized DCP; Sep. 2, 2004; 11 pages; Contributing Members of the UPNP™ Forum.

*RemoteUIClient: 1 Service Template Version 1.01—For UPnP™ Version 1.0*—Standardized DCP; Sep. 2, 2004; 29 pages; Contributing Members of the UPnP™ Forum.

*RemoteUIServer Device: 1 Device Template Version 1.01—For UPnP™ Version 1.0*—Standardized DCP; Sep. 2, 2004; 11 pages; Contributing Members of the UPnP™ Forum.

*RemoteUIServer: 1 Service Template Version 1.01—For UPnP™ Version 1.0*—Standardized DCP; Sep. 2, 2004; 20 pages; Contributing Members of the UPnP™ Forum.

*Open Mobile Alliance—Digital Rights Management—Short Paper*; Open Mobile Alliance; Dec. 2003; 8 pages; Open Mobile Alliance Ltd.

* cited by examiner

SYSTEM AND METHOD FOR MANAGING A WIRELESS CONNECTION TO REDUCE POWER CONSUMPTION OF A MOBILE TERMINAL

CROSS-REFERENCE TO RELATED APPLICATIONS

The present application claims priority from U.S. Provisional Patent Application No. 60/592,874, entitled: System and Method for Managing a Wireless Connection to Reduce Power Consumption of a Mobile Terminal, filed on Jul. 30, 2004, the contents of which are incorporated herein by reference in its entirety.

FIELD OF THE INVENTION

The present invention generally relates to systems and methods of reducing power consumption of a mobile terminal and, more particularly, relates to systems and methods of managing a wireless connection of a mobile terminal to a network to thereby reduce power consumption of the mobile terminal.

BACKGROUND OF THE INVENTION

In the emerging digital home, consumers are acquiring, viewing and/or managing an increasing amount of digital content, particularly media content like photographs, music and video media. Consumers are increasingly acquiring, viewing and/or managing such content on devices in a number of different domains, including consumer electronics (CE), mobile device and personal computer (PC) device domains. In this regard, the Digital Living Network Alliance (DLNA) has produced guidelines to ensure interoperability in home networks between devices in the CE, mobile device and PC device domains. Currently, the DLNA guidelines address fixed devices, such as set-top boxes (STBs), personal video recorders (PVRs), PCs, stereo and home theaters, which are generally static and not power-constrained. However, it is contemplated that future guidelines of the DLNA will also address handheld devices, such as mobile telephones, portable digital assistants (PDAs), pagers, laptop computers, which are generally mobile and power-constrained. Among the different wireless communication techniques, Bluetooth is generally accepted as one of the wireless communication techniques intended to be introduced in DLNA guidelines. And because of the increasing number of Bluetooth-enabled mobile terminals being introduced, Bluetooth is expected to be one of the more popular mobile communication options for mobile terminals in DLNA-compliant networks in the immediate future.

Generally, to connect to a DLNA-compliant network, a Bluetooth-enabled mobile terminal needs to connect via a Bluetooth access point, which bridges between the mobile-terminal domain and the DLNA-compliant network. In this regard, the DLNA is currently standardizing a Network Connectivity Function (NCF) that defines the functionality that should be implemented by DLNA-compliant Bluetooth access point. To provide the necessary support for the TCP/IP-layer suite over the Bluetooth link layer, both the mobile terminal and the NCF must typically support the Bluetooth personal area network (PAN) profile and the Bluetooth network encapsulation protocol (BNEP). For more information on the PAN profile and BNEP, see Bluetooth Special Interest Group, *Personal Area Networking Profile*, version 1.0 (February 2003); and Bluetooth Special Interest Group, *Bluetooth Network Encapsulation Protocol*, version 1.0 (February 2003), the contents of both of which are incorporated herein in its entirety.

Currently, when a mobile terminal is connected to a DLNA-compliant network across an access point in accordance with a wireless communication technique such as Bluetooth, an active connection (e.g., BNEP) is typically maintained between the mobile terminal and an NCF of the access point. Maintaining an active connection, however, typically results in an increase in power consumption of the mobile terminal, as compared to when the mobile terminal is not connected to the network. As will be appreciated, consumers would like to be able to use their mobile terminals to connect to DLNA-compliant networks without noticing a significant reduction in the battery duration of their devices. As such, it would be desirable to design a system, mobile terminal, access point and method of managing a mobile connection to a network to achieve power savings for the mobile terminal over conventional techniques.

SUMMARY OF THE INVENTION

In light of the foregoing background, exemplary embodiments of the present invention provide an improved mobile terminal, and associated access point, method and computer program product for managing a wireless connection. In accordance with exemplary embodiments of the present invention, a wireless connection between the mobile terminal and an access point can be operated in one of a number of different network-connectivity power-saving (NC-PS) modes to achieve power savings of the terminal with respect to the connection and communication across the connection. The NC-PS modes, including an active mode, a disconnected mode, a hibernate mode and/or a standby mode, can be defined as viewed from the network layer (e.g., IP layer) and above, with the underlying link-layer power-saving modes typically depend upon the wireless communication link bearer (e.g. Bluetooth, WLAN, UWB, etc.). To achieve power savings from the network layer and above, the access point can be configured to adapt its behavior to accommodate the new NC-PS mode of the connection, such as by reducing traffic to the terminal when the terminal is placed in the hibernate or standby mode.

According to one aspect of the present invention, a mobile terminal is provided. The mobile terminal includes a processor capable of operating a link manager. The link manager is capable of at least partially operating a wireless connection between the terminal and an access point in an active mode, where the access point is coupled to a network. The link manager is also capable of transitioning the connection from the active mode to a network-connectivity power-saving (NC-PS) mode (e.g., standby mode, hibernate mode, etc.). In this regard, transitioning the connection includes entering the mobile terminal in a power-saving mode of a bearer of the connection, and directing the access point to reduce traffic flowing from the network across the connection to the mobile terminal when the mobile terminal is otherwise capable of receiving the traffic. For example, the link manager can direct the access point to reduce traffic by notifying the access point of the mobile terminal entering the power-saving mode. In this regard, the link manager can be capable of directing the access point to reduce traffic by requesting that the access point enter the mobile terminal in the power-saving mode. Further, when the NC-PS mode comprises a hibernate mode, transitioning the connection can further include terminating the connection between the terminal and the access point. In such instances, the connection can be terminated while maintaining at least one network parameter (e.g., IP address) for the terminal to receive traffic from the network across the connection.

Upon being directed to reduce traffic, the access point can select at least one power-saving technique, and thereafter reduce traffic in accordance with the selected at least one power-saving technique. In this regard, the power-saving technique(s) can be selected based upon at least one power-saving parameter, where the selected power-saving parameter(s) can be received by the access point in a request to enter the mobile terminal in the power-saving mode. The power-saving technique(s) can comprise any of a number of techniques capable of reducing traffic by preventing one or more types of network traffic from flowing to the terminal. For example, the power-saving technique(s) can include preventing multicast traffic, broadcast traffic, address resolution traffic and/or group management traffic.

According to other aspects of the present invention, a method and computer program product are provided for managing a wireless connection with a mobile terminal. Exemplary embodiments of the present invention therefore provide an improved mobile terminal, and associated access point, method and computer program product for managing a wireless connection. In accordance with exemplary embodiments of the present invention a connection between a mobile terminal and an access point may be operated in one of a plurality of modes including, for example, an active mode, a disconnected mode, a standby mode and a hibernate mode. Generally, in the active mode, the mobile terminal and the access point actively communicate across the connection therebetween. In contrast, in the disconnected mode, no connection exists between the terminal and the access point. In the standby mode, the connection is in a power saving mode while maintaining synchronization between the terminal and the access point. While operating the connection in the standby mode, the terminal and the access point can maintain a full-state connection and periodically exchange information regarding the availability of packets, while the access point reduces traffic from the network to the mobile terminal. The overall effect of operating the connection in the standby mode, then, can be seen by the network(s) as a slower, "congested" connection between the terminal and the access point. Therefore, the mobile terminal, and associated access point, method and computer program product of exemplary embodiments of the present invention may solve the problems identified by prior techniques and provide additional advantages.

BRIEF DESCRIPTION OF THE DRAWINGS

Figure 1:
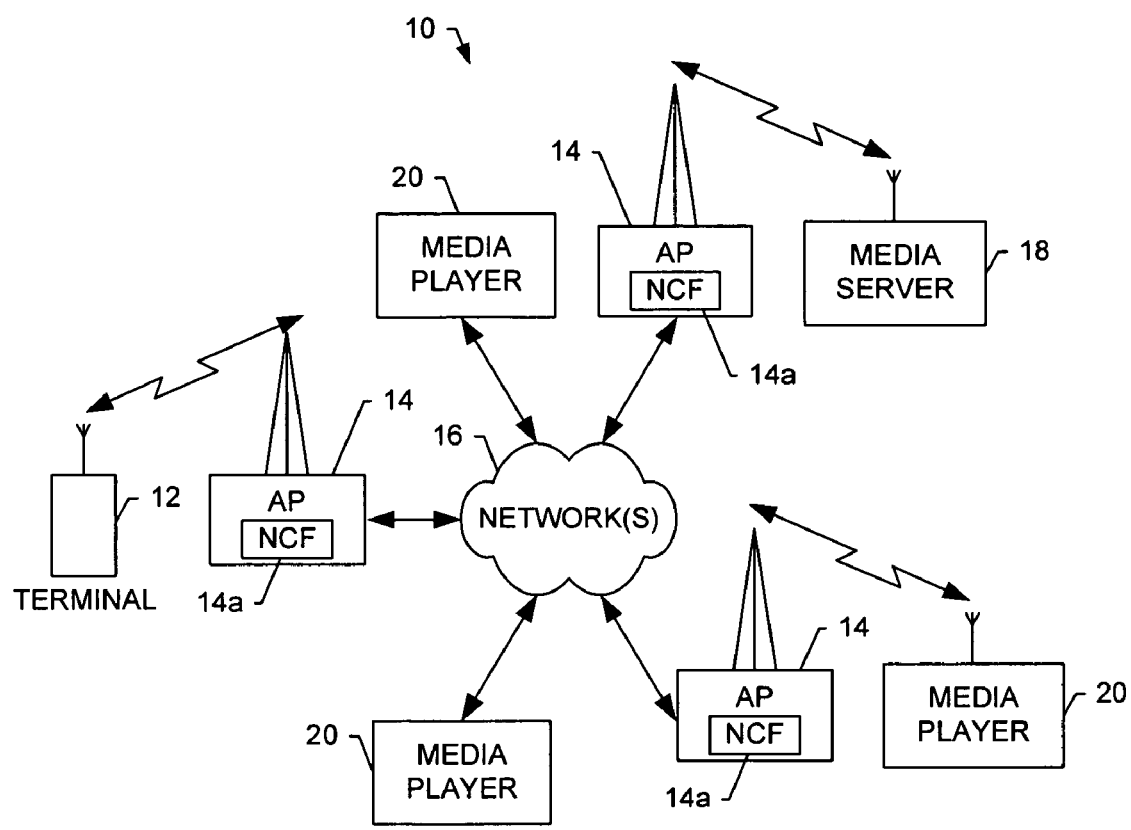
Figure 2:
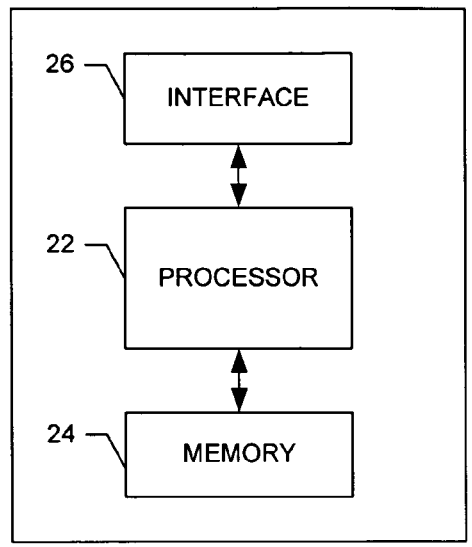
Figure 3:
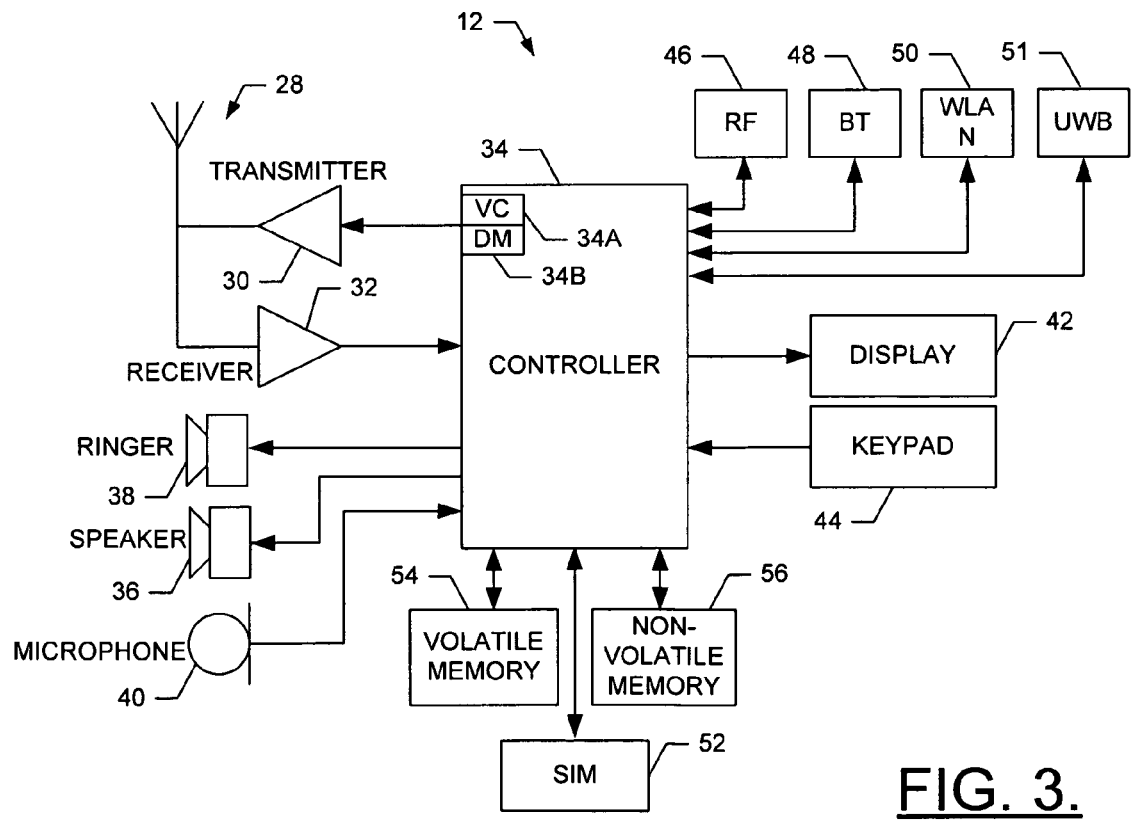
Figure 4:
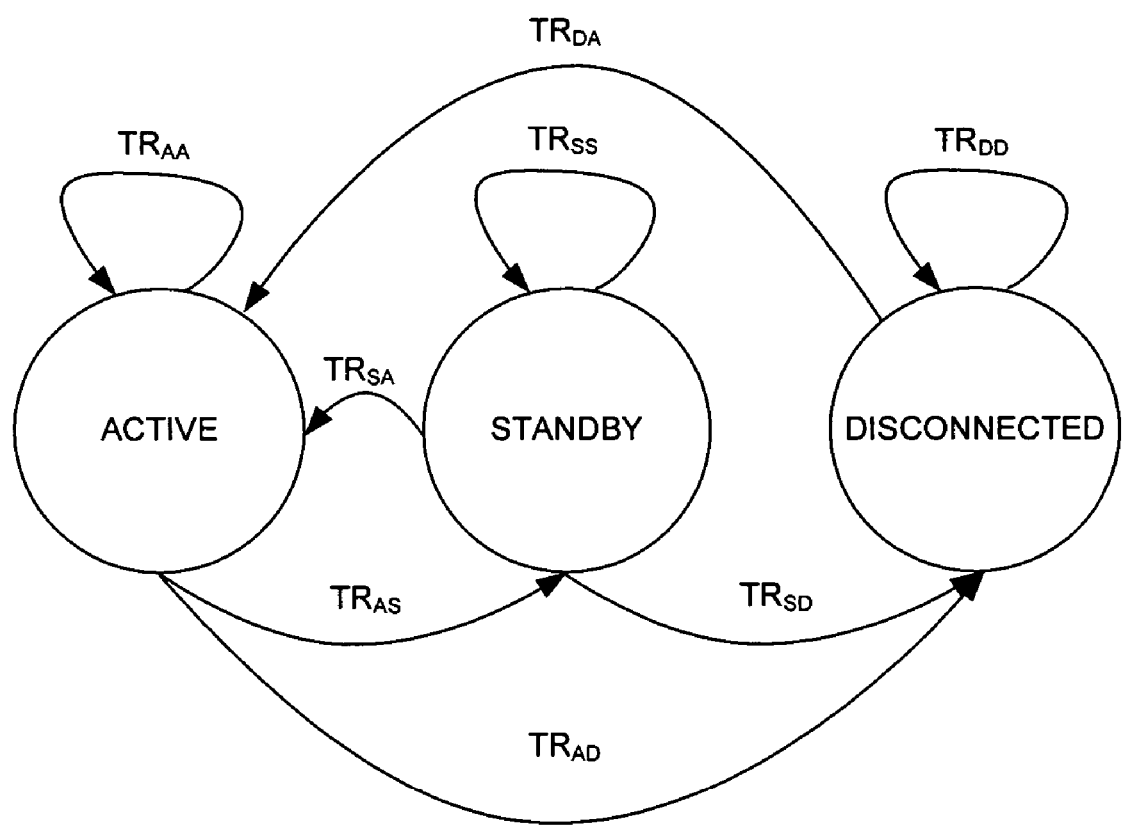
Figure 5:
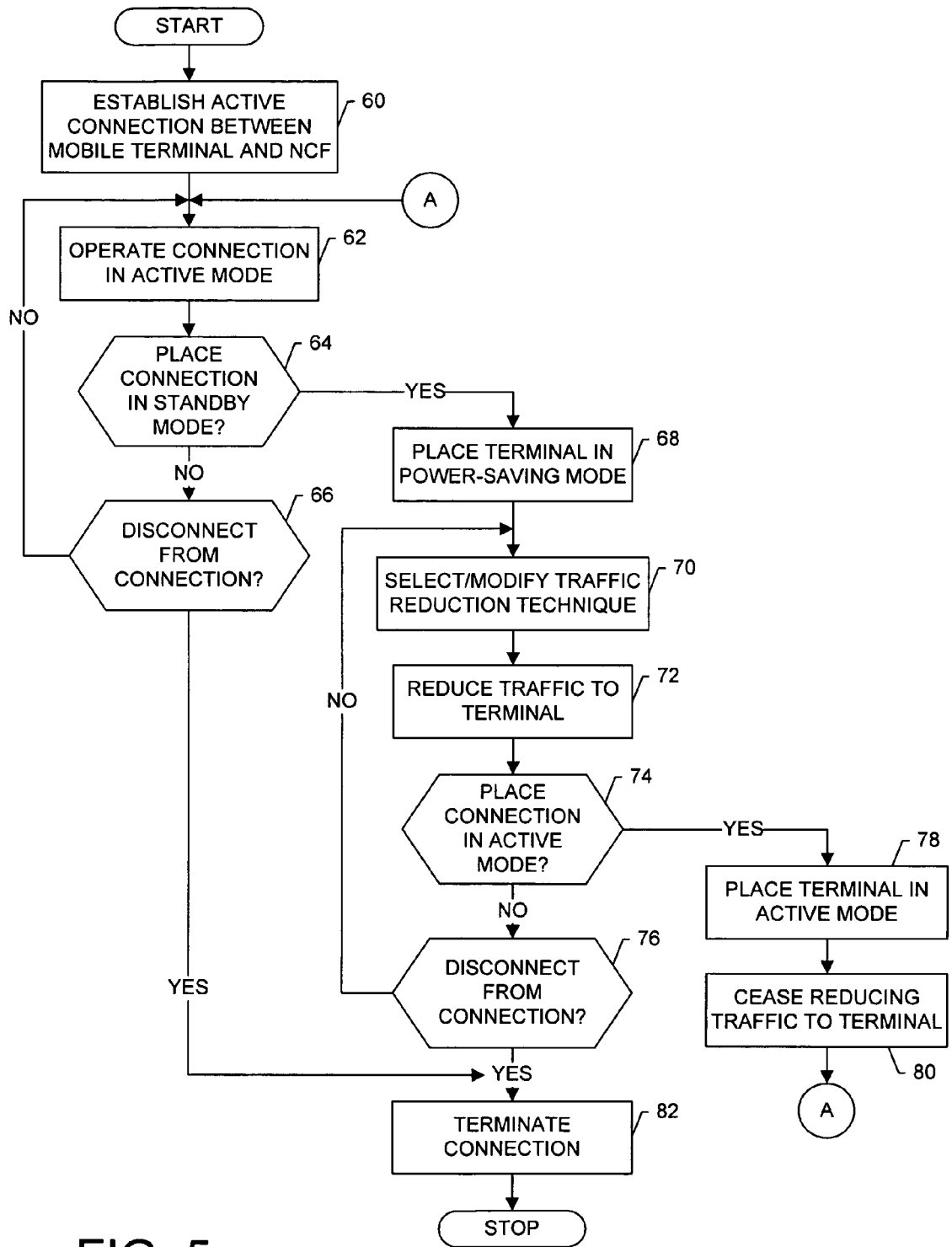
Figure 6:
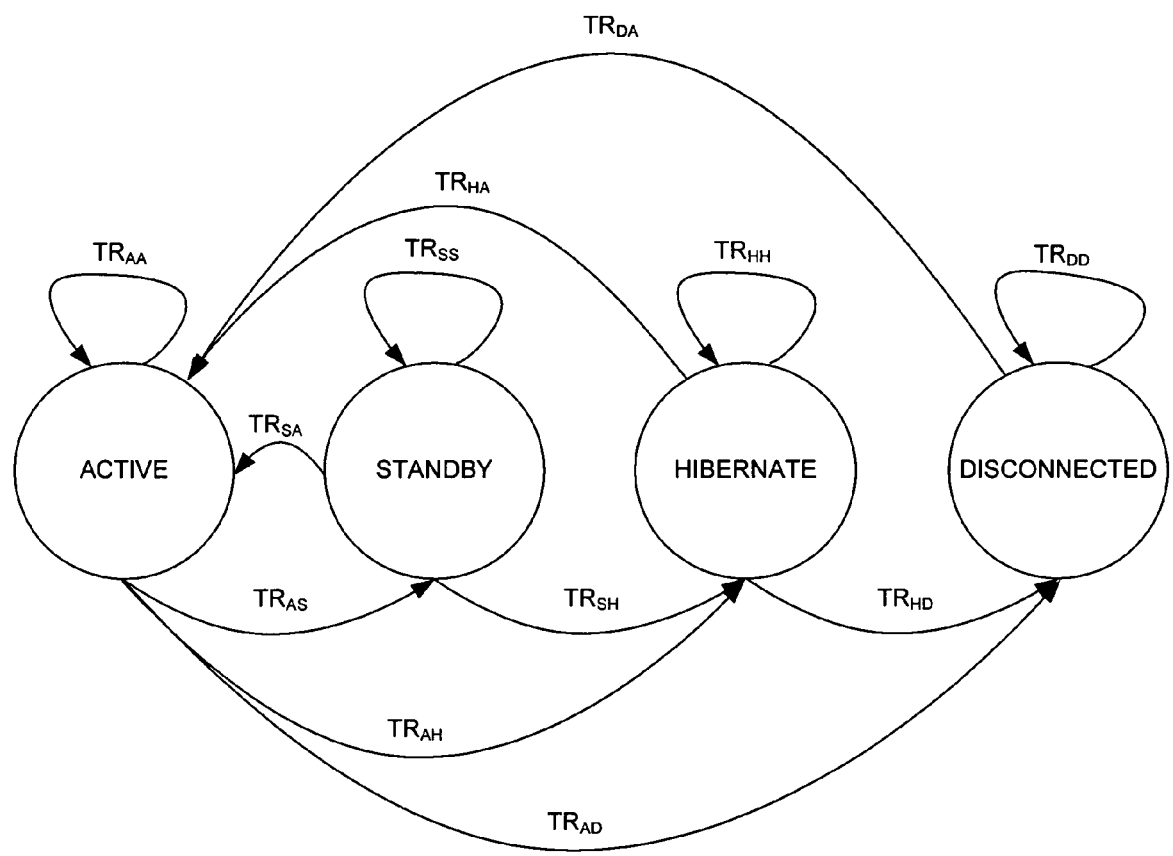
Figure 7A:
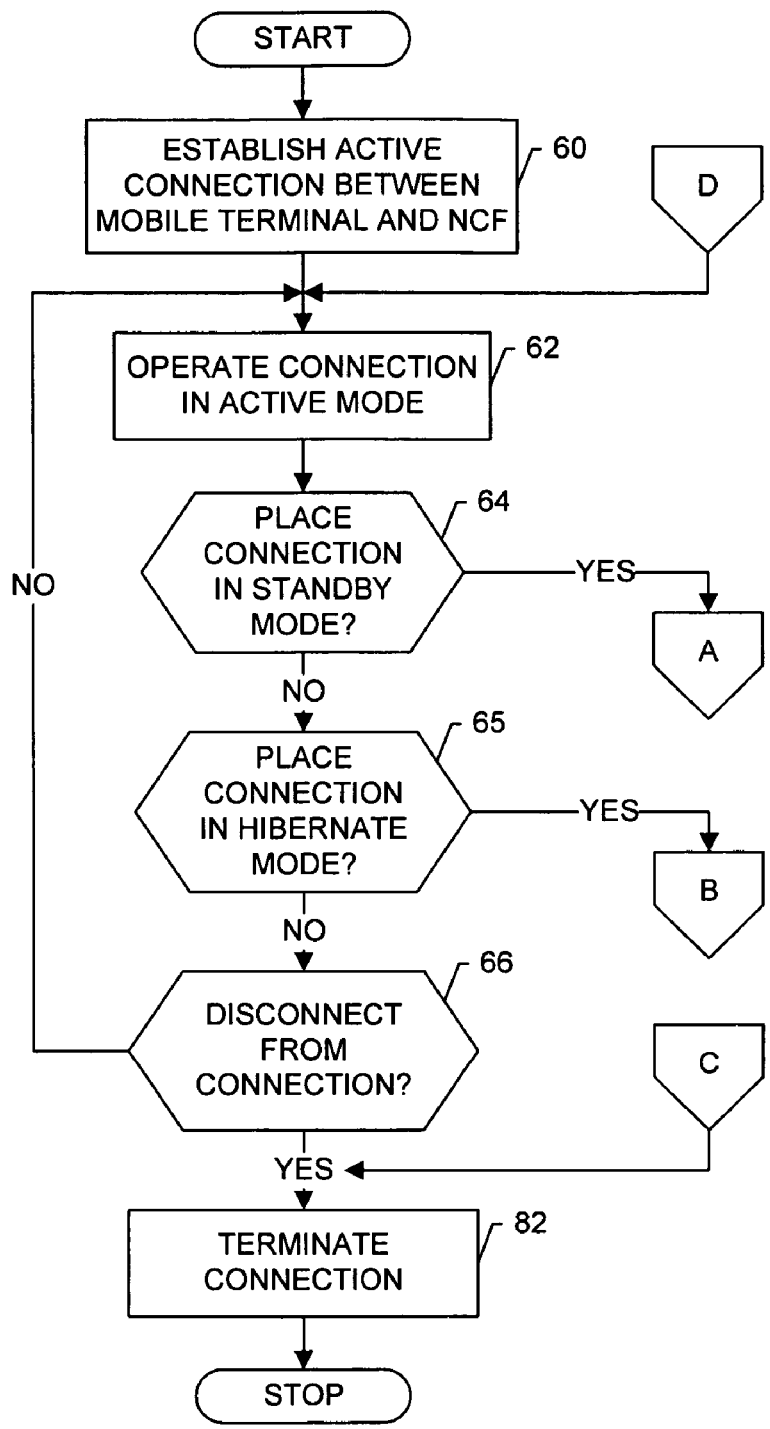
Figure 7B:
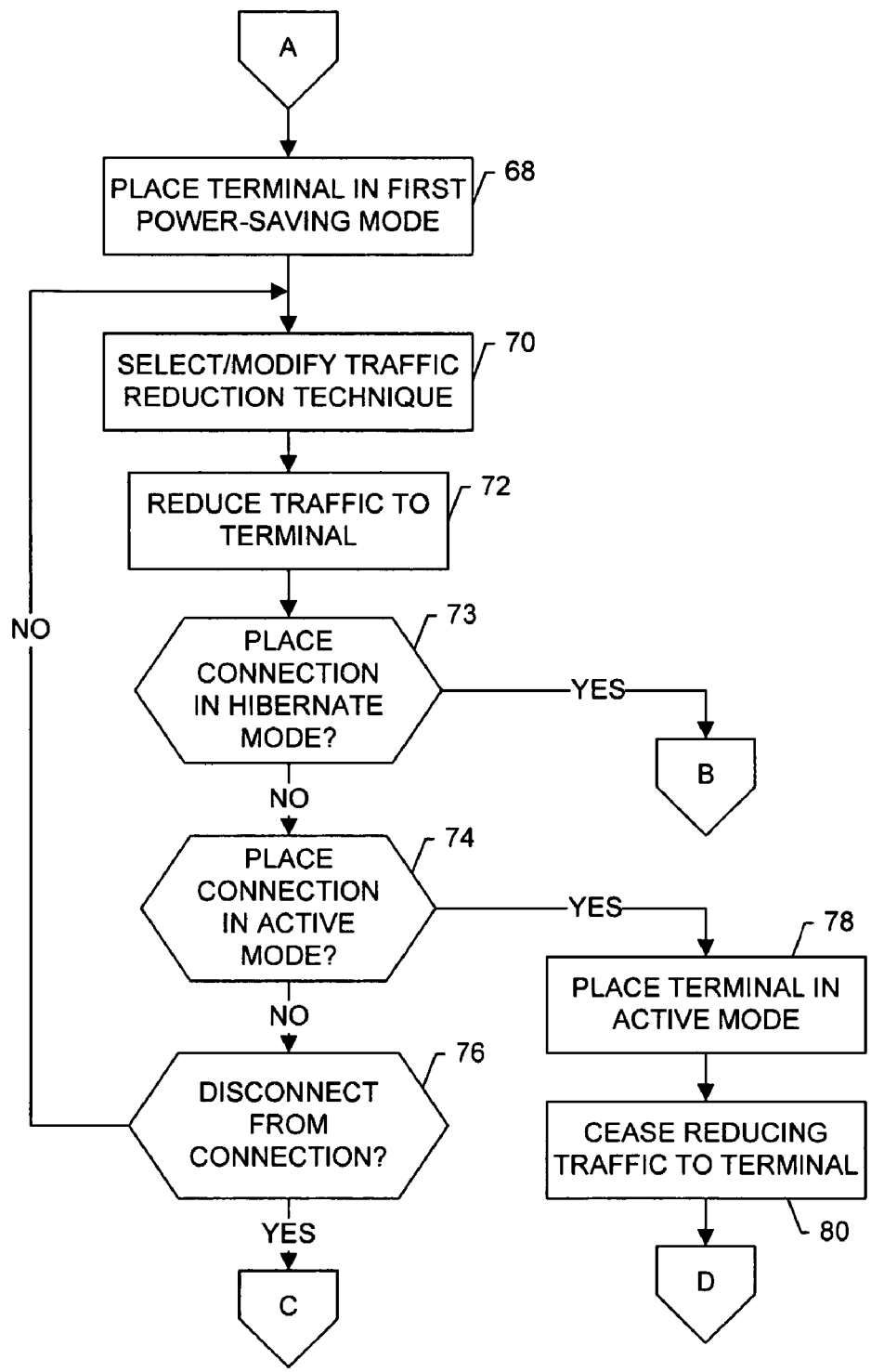
Figure 7C:
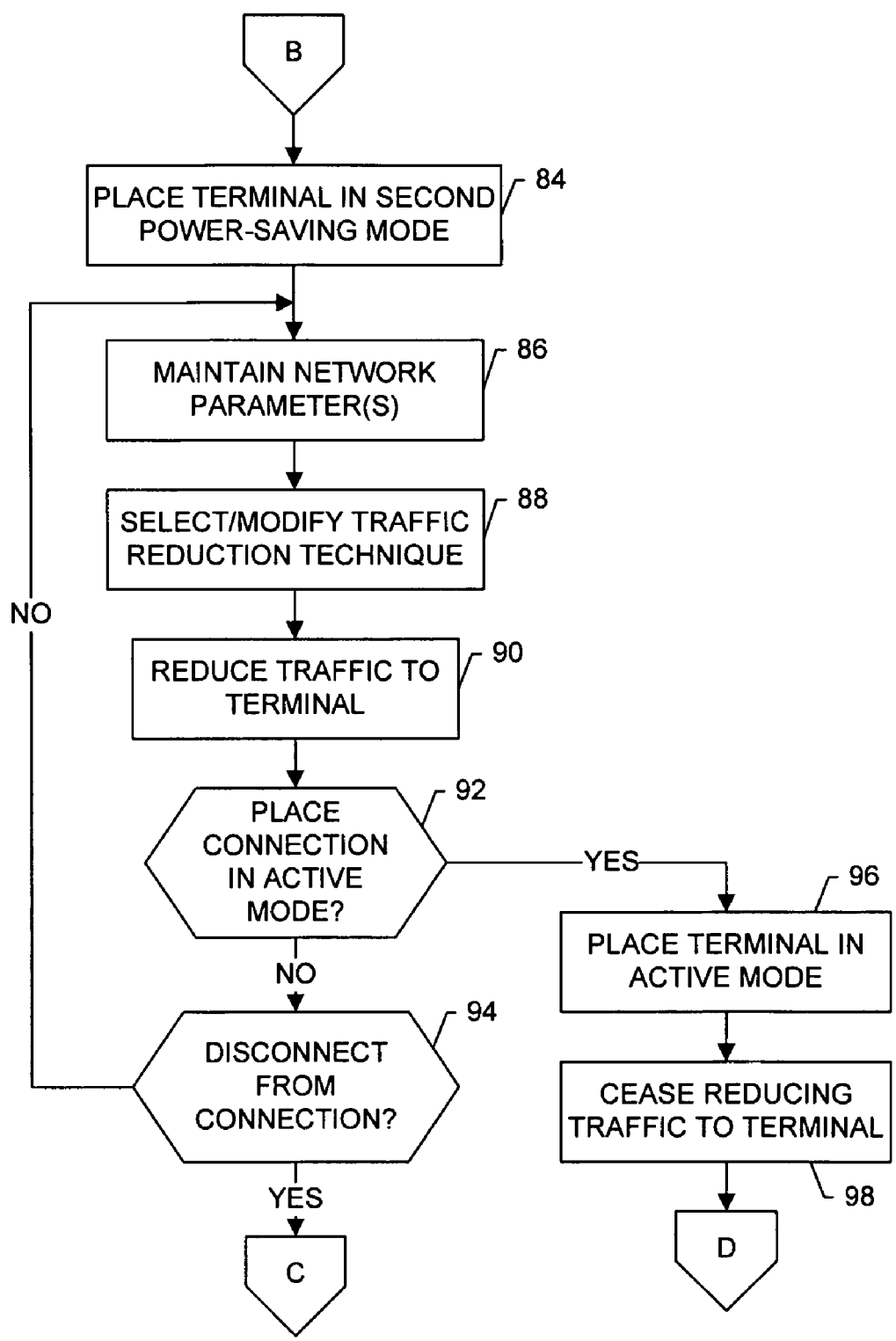

Having thus described the invention in general terms, reference will now be made to the accompanying drawings, which are not necessarily drawn to scale, and wherein:

FIG. 1 is a block diagram of a system and a mobile terminal that may benefit from exemplary embodiments of the present invention;

FIG. 2 is a block diagram of an entity capable of operating as a terminal, access point, media server and/or a media gateway, in accordance with exemplary embodiments of the present invention;

FIG. 3 is a schematic block diagram of a mobile terminal, in accordance with one exemplary embodiment of the present invention;

FIG. 4 is a network-connectivity power-saving (NC-PS) mode transition diagram illustrating various modes of a connection to a terminal, in accordance with one exemplary embodiment of the present invention;

FIG. 5 is a flowchart illustrating various steps in a method of managing a wireless connection with a mobile terminal, in accordance with one exemplary embodiment of the present invention;

FIG. 6 is a network-connectivity power-saving (NC-PS) mode transition diagram illustrating various modes of a connection to a terminal, in accordance with another exemplary embodiment of the present invention; and FIGS. 7a, 7b and 7c are flowcharts illustrating various steps in a method of managing a wireless connection with a mobile terminal, in accordance with another exemplary embodiment of the present invention.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Reference is now made to FIG. 1, which illustrates a system 10 and mobile terminal 12 that may benefit from exemplary embodiments of the present invention. As shown, the terminal may include an antenna for transmitting signals to and for receiving signals from one or more wireless access points 14 (APs). The access point(s) are a part of one or more networks 16, one or more of which include elements capable of sending content to, and/or receiving content from, the terminal via the access point, as explained below. The network(s) can comprise one or more wireline and/or wireless networks, including one or more data and/or cellular networks. In this regard, the network(s) can include data networks, such as a personal area network (PAN), a local area network (LAN), a metropolitan area network (MAN), and/or a wide area network (WAN) like the Internet.

The network(s) 16 can additionally or alternatively include one or more cellular networks, such as any one or more of a number of first-generation (1G), second-generation (2G), 2.5G and/or third-generation (3G) cellular networks. For example, one or more of the network(s) can comprise 2G networks capable of supporting communication in accordance with wireless communication protocols such as IS-136 (TDMA), GSM, and IS-95 (CDMA). Also, for example, one or more of the network(s) can comprise 2.5G networks capable of supporting communication in accordance with wireless communication protocols General Packet Radio Service (GPRS), Enhanced Data GSM Environment (EDGE), or the like. Further, for example, one or more of the network(s) can comprise 3G networks capable of supporting communication in accordance with wireless communication protocols such as Universal Mobile Telephone System (UMTS) network employing Wideband Code Division Multiple Access (WCDMA) radio access technology. In such instances, the access point(s) 14 can be configured to communicate as base station(s) or base site(s), which are well known to those skilled in the art.

The access point(s) 14 can be configured to communicate with the terminal 12 in any of a number of different communication techniques supported by the network(s) 16. For example, the access point(s) can generally be configured to communicate with the terminal in accordance with one or more radio frequency (RF) techniques, and can more particularly be configured to communicate with the terminal in accordance with Bluetooth, wireless LAN (WLAN), and/or Ultrawideband (UWB) techniques, for example. For illustrative purposes, as described herein, an access point can be capable of communicate with the terminal in accordance with a Bluetooth technique. The access point can include or otherwise be associated with a network connectivity function (NCF) 14a that defines the functionality implemented by a DLNA-compliant access point. As used herein, then, functions described as being performed, or capable of being performed, by an access point may more particularly be performed by a NCF of the access point.

As also shown in FIG. 1, devices such as one or more media servers 18 and/or one or more media players 20 can be coupled to the network(s) 16, and thus the terminal 12 via the access point 14. The media servers and/or media players can be coupled to the network(s) in any of a number of different manners. For example, one or more media servers and/or media players can be directly coupled to one or more of the networks. Additionally or alternatively, one or more of the media servers and/or media players can be indirectly coupled to one or more of the networks via one or more access points, the access point(s) being the same as or different from the access point coupling the terminal to the network(s).

The media servers 18 can comprise any of a number of different devices capable of providing content acquisition, recording, storage and/or sourcing capabilities. For example, in accordance with the DLNA architecture, the media servers can comprise set-top boxes (STBs), personal video recorders (PVRs), PCs, stereo and home theaters that include non-volatile memory (e.g., music servers), broadcast tuners, video and imaging capture devices (e.g., cameras, camcorders, etc.), and/or multimedia mobile terminals (e.g., mobile telephones, portable digital assistants (PDAs), pagers, laptop computers, etc.). The media players 20 can comprise any of a number of different devices capable of providing playback and/or rendering capabilities. In accordance with the DLNA architecture, for example, the media players can comprise television (TV) monitors, wireless monitors, game consoles, printers, PCs, stereo and home theaters, video and imaging capture devices, and/or multimedia mobile terminals. As can be seen, in various instances, one or more devices may be capable of functioning as both a media server and a media player.

Irrespective of the specific device, the terminal 12 is capable of directly or indirectly communicating with one or more of the media servers 18 and/or media players 20 via the network(s) 16 and the access point 14. For example, the terminal can be capable of communicating with one or more media servers to download content stored by the respective media server(s). Additionally or alternatively, for example, the terminal can be capable of communicating with one or more media players to control operation of the respective media player(s).

Referring now to FIG. 2, a block diagram of an entity capable of operating as a terminal 12, access point 14, media server 18 and/or a media gateway 20, is shown in accordance with one exemplary embodiment of the present invention. Although shown as separate entities, in some exemplary embodiments, one or more entities may support one or more of a mobile terminal, media server and/or media player, logically separated but co-located within the entit(ies). For example, a single mobile terminal may not only support a mobile terminal but also support a logically separate, but co-located, media server and/or media player. Also, for example, a single media server or media player may support may not only support a media server or media player, respectively, but also support a logically separate, but co-located media player or media server, respectively.

The entity capable of operating as a terminal 12, access point 14, media server 18 and/or a media gateway 20 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 22 connected to a memory 24. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with exemplary embodiments of the present invention. In this regard, when the entity comprises a terminal 12, the memory can store a link manager capable of managing the link between the terminal and an access point 14, or more particularly the terminal and an NCF 14a of the access point, as explained below.

The processor 22 can also be connected to at least one interface 26 or other means for transmitting and/or receiving data, content or the like. The interface(s) can include a means for communicating in accordance with any one or more of a number of different communication techniques. In this regard, the interface(s) can include means for communicating in accordance with any of a number of wireline and/or wireless communication techniques. For example, the interfaces can generally include an RF module capable of communicating in accordance with an RF communication technique, and can more particularly include a Bluetooth module, WLAN module and/or UWB module capable of communicating in accordance with a Bluetooth, WLAN and/or UWB communication technique, respectively. Additionally or alternatively, the interfaces can include means for communicating in accordance with 1G, 2G, 2.5G and/or 3G communication techniques.

Reference is now drawn to FIG. 3, which more particularly illustrates a block diagram of a mobile terminal 12 in accordance with one exemplary embodiment of the present invention. The mobile terminal includes various means for performing one or more functions in accordance with exemplary embodiments of the present invention, including those more particularly shown and described herein. It should be understood, however, that the mobile terminal may include alternative means for performing one or more like functions, without departing from the spirit and scope of the present invention. As shown in FIG. 3, for example, in addition to an antenna 28, the mobile terminal 12 can include a transmitter 30, receiver 32, and controller 34 or other processor that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of 1G, 2G, 2.5G and/or 3G communication techniques or the like.

It is understood that the controller 34 includes the circuitry required for implementing the audio and logic functions of the mobile terminal. For example, the controller may be comprised of a digital signal processor device, a microprocessor device, and various analog-to-digital converters, digital-to-analog converters, and/or other support circuits. The control and signal processing functions of the mobile terminal are allocated between these devices according to their respective capabilities. The controller can additionally include an internal voice coder (VC) 34A, and may include an internal data modem (DM) 34B. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 36, a ringer 38, a microphone 40, a display 42, and a user input interface, all of which are coupled to the controller 34. The user input interface, which allows the mobile terminal to receive data, can comprise any of a number of devices allowing the mobile terminal to receive data, such as a keypad 44, a touch display (not shown) or other input device. In exemplary embodiments including a keypad, the keypad includes the conventional numeric (0-9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

As indicated above, the mobile terminal 12 can also include one or more means for sharing and/or obtaining data from access point(s) 14. As shown in FIG. 3, the mobile terminal can include a RF module 46 capable of transmitting and/or receiving content from one or more media servers 18 via the network(s) 16 and the access point. In addition or in the alternative, the mobile terminal can include other modules, such as, for example, a Bluetooth (BT) module 48, WLAN module 50 and/or UWB 51 module capable of transmitting and/or receiving data in accordance with Bluetooth, WLAN and/or UWB techniques, respectively.

The mobile terminal 12 can further include memory, such as a subscriber identity module (SIM) 52, a removable user identity module (R-UIM) or the like, which typically stores information elements related to a mobile subscriber. In addition to the SIM, the mobile terminal can include other removable and/or fixed memory. In this regard, the mobile terminal can include volatile memory 54, such as volatile random access memory (RAM) including a cache area for the temporary storage of data. The mobile terminal can also include other non-volatile memory 56, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal. In this regard, as explained below, the memories can store a link manager capable of managing the connection between the mobile terminal and an access point 14 of the system 10.

A number of network entities of the system 10 (e.g., terminal 12, access point 14, media server 20, etc.) are configured to operate in accordance with a protocol stack, such as the protocol stack provided by the Bluetooth model. As will be appreciated, the protocol stack may be implemented in software, hardware, firmware or combinations of the same. More particularly, the Bluetooth model includes a number of layers, including an application layer, RFCOMM layer, Bluetooth network encapsulation protocol (BNEP) layer, a logical link control and adaptation layer protocol (L2CAP) layer, a host controller interface (HCL) layer, a link manager protocol (LMP) layer, a baseband and link control layer (supporting synchronous connection-oriented (SCO) links and asynchronous connection-less (ACL) links), and a radio layer. Further, the Bluetooth model may include a number of additional adopted layers, such as a link layer (e.g., PPP), a network layer (e.g., IP) and a transport layer (e.g., TCP, UDP) between the application layer and RFCOMM layer.

As will be appreciated, the protocol stack provided by the Bluetooth model is particularly useful when establishing a connection, and communicating over the connection, in accordance with Bluetooth. It should be understood, then, that a number of different communication techniques may have a number of different respective protocol stacks. Generally, however, each layer of a protocol stack performs a specific data communications task, a service to and for the layer that precedes it (e.g., the L2CAP provides a service for the BNEP layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

Actual data flow between two entities (e.g., terminal 12 and access point 14) is from top to bottom in the source entity, across the communications line, and then from bottom to top in the destination entity. Each time that user application data passes downward from one layer to the next layer in the same entity more processing information is added. When that information is removed and processed by the peer layer in the other entity, it causes various tasks (error correction, flow control, etc.) to be performed.

As explained in the background section, currently, when a mobile terminal 12 is connected to a DLNA-compliant network across an access point 14 in accordance with a wireless communication technique such as Bluetooth, an active connection (e.g., BNEP/L2CAP/ACL) is typically maintained between the mobile terminal and an NCF 14a of the access point. Maintaining an active connection, however, can undesirably result in an increase in power consumption of the mobile terminal, as compared to when the mobile terminal is not connected to the network. As such, exemplary embodiments of the present invention permit the mobile terminal and/or the access point to manage a wireless connection or link therebetween to achieve power savings for the mobile terminal over conventional techniques.

In accordance with exemplary embodiments of the present invention, the mobile terminal 12 can operate a wireless connection between the mobile terminal and an access point 14 in one of a number of different network-connectivity power-saving (NC-PS) modes to achieve power savings of the terminal with respect to the connection and communication across the connection. The NC-PS modes are defined as viewed from the network layer (e.g., IP layer) and above. As explained herein, the underlying link-layer power-saving modes typically depend upon the specific type of wireless communication link (e.g. Bluetooth, WLAN, UWB, etc.). To achieve continuity, then, the link-layer power-saving modes can be accordingly mapped to the NC-PS modes. In addition, a mobile terminal whose connection is in a NC-PS mode may also be configured to take other power-saving measures (e.g. operate processor in a low-power state, shut down display, etc.).

To achieve power savings, the mobile terminal 12, or more particularly the link manager of the mobile terminal, and the NCF 14a of the respective access point 14 are capable communicating to operate the connection therebetween in one of the NC-PS modes. As will be appreciated, however, there may be an asymmetry between the NCF and the mobile terminal. In this regard, the NCF is typically a "plug"-powered device and therefore can be assumed to be always active and to be able to afford more power-intensive operations (e.g. continuous Bluetooth inquiry scanning and page scanning). Mobile terminals, on the other hand, are typically battery-powered devices that would more likely benefit from power saving operation. As such, although the NCF can control the transitions from one NC-PS mode to another, the link manager of the mobile terminal typically has more control over such transitions. Thus, in such instances where the link manager directs the transition from one NC-PS mode to another, the NCF can be configured to adapt its behavior to accommodate the new NC-PS mode of the connection.

More particularly, the mobile terminal 12 and the NCF 14a of a respective access point 14 can operate the connection therebetween in one of a plurality of modes. For example, the NCF can be configured to operate in one of an active mode, a disconnected mode and a standby mode. Generally, in the active mode, the mobile terminal and the NCF actively communicate across the connection therebetween. In contrast, in the disconnected mode, no connection exists between the terminal and the NCF. Thus, for the terminal to communicate across the network(s) 16 via the access point, a new connection establishment process is typically performed between the terminal and the NCF to first establish a connection therebetween. In the standby mode, the connection is in a power saving mode while maintaining synchronization between the terminal and the NCF. Thus, the terminal typically need not rejoin the home network to communicate across the network(s) via the access point. While operating the connection in the standby mode, the terminal and the NCF can maintain a full-state connection and periodically exchange information regarding the availability of packets. For example, the terminal and NCF can buffer traffic for the terminal for a period of time (e.g., 0.5-3 seconds or more). Following the period of time, the NCF can deliver the buffered traffic, after which the period of time may be reset, if so desired. The process can then repeat for the duration of the connection in the standby mode. The overall effect of operating the connection in the standby mode can be seen by the network(s) as a slower, "congested" connection between the terminal and the NCF.

As will be appreciated, the particular type, protocol or standard (i.e., "bearer") of the connection between the mobile terminal 12 and the NCF 14a of the access point 14 may have defined modes of operation of the mobile terminal operating in accordance with that communication protocol. In accordance with Bluetooth, for example, the mobile terminal in the connected state can operate in several modes. In an active mode, the mobile terminal listens to time and frequency slots for data packets from the NCF and then sends data packets in other allocated slots. In such an instance, a BNEP/L2CAP/ACL connection exists between the terminal and the NCF. If no data is being transferred, however, the terminal can be placed into a sniff mode during which the terminal polls the NCF at a reduced rate. More particularly, in the sniff mode, the terminal periodically (every "sniff interval") wakes up from a low-power state and communicates with the NCF at the baseband to determine if the NCF has any traffic for the terminal. If the NCF does not respond with traffic for the terminal within a period of time ("sniff attempt"), the terminal returns to the low-power state. If the NCF does respond with traffic for the terminal, however, the terminal remains powered up for another period of time ("sniff timeout") to receive the data from the NCF. In such instances, the NCF can buffer traffic for the terminal between sniff intervals such that the traffic can be delivered to the terminal during the sniff intervals.

Alternatively, in accordance with Bluetooth, the mobile terminal 12 can be placed into a hold mode. In the hold mode, an internal timer is started and the terminal becomes inactive for a fixed duration which, if so desired, can be made periodic. In this regard, in the hold mode, the terminal can be configured similar to the sniff mode by periodically placing the terminal "on hold" if the NCF 14a does not have any traffic for the terminal. In contrast to the sniff mode which can be carried out at the Bluetooth hardware level, however, operating the terminal in the hold mode in this manner may require logic implemented by a higher-level application operating on the terminal. Finally, the terminal can be placed in a park mode, which is one of a number of different manners in which the terminal can disconnect from the NCF. In park mode, then, the terminal surrenders its device address and does not participate in data traffic. As will be appreciated, like in the active mode, a BNEP/L2CAP/ACL connection exists between the terminal and the NCF in the sniff and hold modes. In the park mode, however, the terminal and NCF do not typically have a BNEP/L2CAP/ACL connection therebetween. For more information on the modes of operation in accordance with Bluetooth or the Bluetooth specification in general, see Bluetooth Special Interest Group, *Specification of the Bluetooth System*, version 1.1, volumes 1 and 2 (February 2001), the contents of both of which are hereby incorporated by reference in its entirety.

In accordance with exemplary embodiments of the present invention, one or more of the NC-PS modes of the connection between the mobile terminal 12 and the NCF 14a of the access point 14 can be mapped to power-saving modes of the bearer of the connection. Thus, for example, when the bearer is Bluetooth and the connection is placed in the active NC-PS mode, the mobile terminal can be placed in the Bluetooth active mode. And when the connection is placed in the standby NC-PS mode, the mobile terminal can be placed in a Bluetooth power-saving mode, such as the Bluetooth sniff mode or hold mode.

In addition to mapping the NC-PS mode to a power-saving mode of the bearer of the connection between the mobile terminal 12 and the NCF 14a, the NCF can be configured to reduce traffic flowing to the mobile terminal across the connection when the connection is operated in the standby NC-PS mode. As will be appreciated, reducing traffic flowing in the connection between the terminal and the NCF can result in power savings for the terminal (and possibly for the access point 14) since the terminal and the NCF spend less time communicating. The NCF can reduce traffic to the mobile terminal across the connection in any of a number of different manners. For example, the NCF can be configured to filter multicast traffic (e.g., universal plug-and-play (UPnP) advertisements, etc.) and/or broadcast traffic from flowing to the mobile terminal across the connection. Additionally or alternatively, for example, the NCF can be capable of performing ARP (address resolution protocol) proxying on behalf of the terminal to thereby prevent ARP traffic from flowing to the terminal (e.g., ARP requests for the terminal). Further, for example, the NCF can be capable of performing IGMP (Internet group management protocol) proxying on behalf of the terminal to thereby prevent IGMP traffic from flowing to the terminal.

As will be appreciated, various traffic reduction techniques (e.g., UPnP multicast filtering) may have an impact on the functionality offered to the mobile terminal 12. Also, different traffic reduction operations may reduce the traffic flowing to the terminal and the NCF 14a by different amounts. As such, the traffic reduction technique(s) performed by the NCF can be dynamically configured or set. In this regard, the traffic reduction technique(s) can be dynamically configured not only based upon the NC-PS mode of the connection, but also based upon one or more bearer power-saving parameters (e.g., sniff interval, etc.).

As previously mentioned, the mobile terminal 12, or more particularly the link manager of the terminal, can direct a transition of the connection between the terminal and the NCF 14a from one NC-PS mode to another NC-PS mode. In response to the transition, then, the NCF can modify traffic to the terminal across the connection, such as by reducing traffic to the terminal when the connection transitions from the active NC-PS mode to the standby NC-PS mode. In this regard, the terminal can notify the NCF of the transition in any of a number of different manners. In accordance with one embodiment, for example, the terminal can notify the NCF based upon a mode transition of the terminal during mapping of the NC-PS mode to the modes (e.g., power-saving modes) of the bearer of the connection. For example, when the bearer of the connection comprises Bluetooth, the terminal can notify the NCF of a transition by notifying or otherwise requesting a transition to/from the Bluetooth sniff mode or hold mode, which notification the NCF can also interpret as a notification to accordingly transition the respective NC-PS mode. Advantageously, by notifying the NCF of the NC-PS mode transition during mapping of the NC-PS mode to the modes of the bearer of the connection, exemplary embodiments of the present invention can function without introducing a new protocol message sequence to thereby notify the NCF.

As will be appreciated, the connection between the mobile terminal 12 and the NCF 14a of the access point 14 can be repeatedly transitioned between, and operated in, various of the NC-PS modes. In this regard, reference is now made to FIG. 4, which illustrates a NC-PS mode transition diagram in accordance with one exemplary embodiment of the present invention. As shown, the connection can transition from an active mode to a standby mode ($TR_{AS}$) or a disconnected mode or state ($TR_{AD}$). Typically, the terminal (or more typically the link manager of the terminal) determines when to transition the connection from the active mode to the standby mode, with either the terminal or the NCF being capable of determining when to transition the connection to the disconnected state. The terminal and/or NCF can determine when to transition the connection from the active mode in any of a number of different manners. For example, the terminal and/or NCF can determine to transition the connection from the active mode to either the standby mode or the disconnected state based upon terminal user and/or access point user action, an inactivity timer, and/or higher layer (e.g., UPnP) applications.

As also shown, the connection can transition from a standby mode to a disconnected mode or state ($TR_{SD}$) or an active mode ($TR_{SA}$). Similar to before, the terminal 12, or more particularly the link manager of the terminal, can determine when to transition the connection from the standby mode to the active mode, such as in any of a number of different manners. On the other hand, either the terminal or the NCF can be capable of determining when to transition the connection to the disconnected state, also in any of a number of different manners. In addition, the connection can transition from the disconnected mode or state to an active mode ($TR_{DA}$) (or less typically a standby mode), with the terminal typically determining when to make such a transition. Further, the connection can transition to the same mode or otherwise remain in the same mode ($TR_{AA}$, $TR_{SS}$, $TR_{DD}$), with the terminal typically determining how long the connection remains in the same NC-PS mode. In this regard, the terminal can determine how long the connection remains in the same NC-PS mode in any of a number of different manners, such as based upon terminal user action, one or more timers (e.g., inactivity timer, minimum and/or maximum time in a given mode, etc.), and/or higher layer (e.g., UPnP) applications.

Reference is now drawn to FIG. 5, which illustrates various steps in a method of managing a wireless connection with a mobile terminal 12, in accordance with one exemplary embodiment of the present invention. As shown in block 60, the method can include establishing an active connection between the mobile terminal and an access point 14, or more particularly the NCF 14a of the access point. The active connection can be established in any of a number of different manners. In accordance with Bluetooth, for example, under normal conditions, the mobile terminal 12 periodically "wakes-up" and enters an inquiry mode and, while in the inquiry mode, repeatedly broadcasts an inquiry message over a set of frequencies, inviting other devices, such as an access point, to respond. In this regard, the inquiry message may specify that only an NCF should respond and this is specified as an access code at the beginning of the message. After broadcasting the inquiry message, the terminal can listen for an inquiry response message from a terminal on a different set of frequencies. The NCF, operating in an inquiry scan mode, listens for an inquiry message such as that broadcast by the terminal. In response to receiving such a message, then, the NCF can reply with an inquiry response message, which contains the device address of the respective NCF.

The terminal 12, now in possession of the respective NCF's device address, passes into page mode. A page message can then be transmitted using a hopping sequence determined by the device address of the NCF 14a. The NCF, operating in a page scan mode, receives the page message and replies by sending a page response message to the terminal. The process by which the terminal begins to synchronize with the NCF's clock now begins. The NCF sends a special control packet that includes information relating to its clock data and the channel hopping sequence to be used and the terminal confirms receipt with a response. The terminal and the NCF are now in a connected state and can begin exchanging packets of data, such as data to/from the network(s) 16, or more particularly entities (e.g., media server(s) 18 and/or media player(s) 20) coupled to the network(s).

As explained above, the terminal 12 functions as a master device by operating in the inquiry and/or page modes to initiate a connection with an NCF 14a of an access point 14 functioning as a slave device by performing inquiry and page scanning of respective messages from the terminal. It should be understood, however, that in various instances an NCF may additionally or alternatively function as a master device, and accordingly operate in an inquiry and/or page modes to initiate a connection with a terminal similarly functioning as a master device or functioning as a slave device, where the terminal may also be capable of performing inquiry and page scanning of respective messages from the NCF.

Irrespective of how the active connection is established between the mobile terminal 12 and the NCF 14a, the connection can thereafter be operated in the active mode with the mobile terminal and NCF exchanging packets of data, communication, information or the like across the connection, as shown in block 62. As the connection is operated in the active mode, the terminal, or more particularly the link manager of the terminal, may be triggered to maintain the connection in the active mode or place the connection in the standby mode, or the link manager and/or NCF may be triggered to place the connection in the disconnected mode or state, as shown in blocks 64 and 66. As indicated above, the link manager and/or NCF can be triggered in any of a number of different manners, such as based upon terminal user and/or access point user action, an inactivity timer, and/or higher layer (e.g., UPnP) applications.

Irrespective of how the link manager of the mobile terminal 12 and/or the NCF 14a are triggered, if the terminal and/or NCF are triggered to maintain the connection in the active mode, or otherwise not triggered to transition the connection out of the active mode, the mobile terminal and NCF can continue to operate the connection in the active mode. However, if the terminal and/or NCF are triggered to transition the connection from the active mode to the disconnected mode or state, the respective entity can disconnect, terminate or otherwise tear down the connection between the terminal and the NCF, as shown in block 82. In such instances, the connection can be returned to the active mode by re-establishing the connection between the mobile terminal and the NCF (see block 60). If, on the other hand, the link manager is triggered to transition the connection from the active mode to the standby mode, the link manager can place the terminal in a power-saving mode of the bearer of the connection, as shown in block 68. In accordance with Bluetooth, for example, the link manager can place the terminal in either the sniff mode or hold mode, thereby mapping the standby NC-PS mode to a power-saving mode of the bearer of the connection.

As the link manager places the mobile terminal 12 in the sniff/hold mode, the link manager sends a link manager protocol (LMP) request, to the NCF 14a, to enter the terminal in the sniff/hold mode, where the request includes one or more power-saving parameters. For example, when the link manager places the terminal in the sniff mode, the sniff mode request can include the sniff interval, the offset, sniff attempt and sniff timeout, all of which are well known to those skilled in the art. Alternatively, for example, when the link manager places the terminal in the hold mode, the hold mode request can include the hold time and the hold instant (i.e., time the hold mode becomes effective).

Also as the link manager places the mobile terminal 12 in the power-saving mode of the connection bearer, the link manager can notify the NCF 14a of the transition from the active mode to the standby mode. As indicated above with respect to Bluetooth, for example, the NCF can be configured to interpret the sniff/hold request of the link manager as the link manager transitioning the connection from the active mode to the standby mode. In this regard, by notifying the NCF of the transition to the standby mode, the link manager directs the NCF to operate to reduce traffic to the terminal. Before the NCF reduces traffic to the terminal, however, the NCF can select, or receive a selection of, one or more techniques by which the NCF is to reduce traffic to the terminal, as shown in block 70. As indicated above, various traffic reduction techniques (e.g., UPnP multicast filtering) may have an impact on the functionality offered to the mobile terminal, and/or may reduce the traffic flowing to the terminal and the NCF by different amounts. As such, the traffic reduction technique(s) performed by the NCF, such as multicast filtering, ARP proxying and/or IGMP proxying, can be dynamically configured or set based upon one or more of the bearer power-saving parameters (e.g., sniff interval, etc.).

Irrespective of how the traffic reduction technique(s) are selected, the NCF can thereafter reduce traffic to the mobile terminal 12 across the connection, the traffic being reduced based upon the selected traffic reduction technique(s) (e.g., multicast filtering, ARP proxying, IGMP proxying, etc.), as shown in block 72. The connection can then be operated in the standby mode, with the terminal operating a power-saving mode of the connection bearer (e.g., maintaining the terminal in the sniff mode, or periodically placing the terminal in the hold mode), and the NCF reducing traffic to the terminal. As the connection is operated in the standby mode, the terminal, or more particularly the link manager of the terminal, may be triggered to maintain the connection in the standby mode or return the connection to the active mode, or the link manager and/or NCF may be triggered to place the connection in the disconnected mode or state, such as in any one or more of the manners described above, as shown in blocks 74 and 76. If the terminal and/or NCF is triggered to maintain the connection in the standby mode, or otherwise not triggered to transition the connection out of the standby mode, the terminal and NCF can continue to operate the connection in the standby mode, including modifying the traffic reduction technique(s) if so desired. In this regard, in maintaining the connection in the standby mode, the terminal, or more particularly the link manager of the terminal, can be capable of modifying the bearer power-saving mode and/or the mode parameters (e.g., sniff interval, etc.). For example, when the terminal is operating in the Bluetooth sniff mode, the link manager can be capable of decreasing or increasing the sniff interval.

If the mobile terminal 12 and/or NCF 14a are triggered to transition the connection from the standby mode to the disconnected mode or state, however, the respective entity can disconnect, terminate or otherwise tear down the connection between the terminal and the NCF, as again shown in block 82. And as indicated above, the connection can thereafter be returned to the active mode by re-establishing the connection between the mobile terminal and the NCF (see block 60). If the link manager is triggered to transition the connection from the standby mode to the active mode, the link manager can place the terminal in the active mode of the bearer of the connection, as shown in block 78. In accordance with Bluetooth, for example, the link manager can place the terminal in the active mode, thereby mapping the standby NC-PS mode to a power-saving mode of the bearer of the connection. More particularly, when the link manager placed the terminal in the sniff mode, the link manager can return the terminal to the active mode by ending the sniff mode, including sending a LMP unsniff request to the NCF. Alternatively, if the link manager placed the terminal in the hold mode, and periodically renewed the hold mode, the link manager can return the terminal to the active mode by ceasing to renew the hold mode, including ceasing to send subsequent hold mode requests to the NCF.

Also, as the link manager returns the mobile terminal 12 to the active mode, the link manager can notify the NCF 14a of the transition from the standby mode to the active mode. When the link manager placed the terminal in the Bluetooth sniff mode, for example, the NCF can be configured to interpret the unsniff request of the link manager as the link manager transitioning the connection from the standby mode to the active mode. Alternatively, for example, when the link manager placed the terminal in the Bluetooth hold mode, the NCF can be configured to interpret the failure of the NCF to receive a subsequent hold request from the link manager as the link manager transitioning the connection from the standby mode to the active mode. Irrespective of how the NCF is notified, however, the NCF can thereafter cease to reduce traffic to the terminal, as shown in block 80. Then, after the link manager has reduced the terminal to the active mode, and the NCF has ceased reducing traffic to the terminal, the connection between the terminal and the NCF can again be operated in the active mode, as shown in block 62. The technique can then continue, with the terminal and/or NCF capable of transitioning the connection therebetween between one or more of a number of modes of operation (e.g., active, standby, disconnected).

As explained above, a mobile terminal 12 and a NCF 14a of a respective access point 14 can be configured to operate in one of an active mode, a disconnected mode and a standby mode. It should be understood, however, that the terminal and NCF can be configured to operate in any of a number of other additional or alternative modes, without departing from the spirit and scope of the present invention. For example, in addition to an active mode, disconnected mode and standby mode, the terminal and NCF can be further configured to operate in a hibernate mode. In the hibernate mode in such instances, the connection between the terminal and the NCF is in a deep sleep mode or otherwise terminated such that a connection does not exist between the terminal and NCF for support of network (e.g., IP) traffic between the terminal and the NCF. More particularly, for example, when the bearer comprises Bluetooth and the connection is in the hibernate mode, the terminal and NCF do not typically have a BNEP/L2CAP/ACL connection therebetween. In contrast to the disconnected mode (particularly when the connection is terminated) where only the NCF may perform inquiry and page scanning, with the connection in the hibernate mode, both the terminal and the NCF may be configured to perform inquiry and page scanning to receive respective messages from the other during initiation of a connection. Additionally or alternatively, with the connection in the hibernate mode, the terminal and/or NCF may be configured to maintain one or more parameters (e.g., IP address) required for the terminal to communicate with the network(s) 16 across an active mode connection between the terminal and the NCF. In this regard, to maintain the IP address of the terminal while the connection is in the hibernate mode, the NCF may be required to perform ARP proxying on behalf of the terminal to defend the terminal's IP address in the case of an auto-configuration. If the terminal obtained its IP address through DHCP (dynamic host configuration protocol), on the other hand, before the terminal's lease on the address expires, the terminal may be required to periodically return to the active mode to send a DHCP request to renew its lease.

As before, the NC-PS modes of the connection between the mobile terminal 12 and the NCF 14a of the access point 14 can be mapped to power-saving modes of the bearer of the connection. Thus, for example, when the bearer is Bluetooth and the connection is placed in the additional hibernate NC-PS mode, the mobile terminal can be placed in the Bluetooth park mode. Also, similar to operating the connection in the standby mode, operation of the connection in the hibernate mode can include the NCF reducing traffic flowing to the mobile terminal across the connection. As before, the NCF can reduce traffic to the mobile terminal across the connection in any of a number of different manners including, for example, multicast filtering, broadcast filtering, ARP proxying and/or IGMP filtering.

Also similar to before, the mobile terminal 12, or more particularly the link manager of the terminal, can direct a transition of the connection between the terminal and the NCF 14a from one NC-PS mode to another NC-PS mode. In response to the transition, then, the NCF can modify traffic to the terminal across the connection, such as by reducing traffic to the terminal when the connection transitions from the active NC-PS mode to the standby NC-PS mode. In this regard, the terminal can notify the NCF of the transition in any of a number of different manners, such as based upon a mode transition of the terminal during mapping of the NC-PS mode to the modes (e.g., power-saving modes) or via an additional or modified message exchange between terminal and NCF. For example, when the bearer of the connection comprises Bluetooth, the terminal can notify the NCF of a transition to/from the hibernate mode by notifying or otherwise requesting a transition to/from the Bluetooth park mode, which notification the NCF can also interpret as a notification to accordingly transition the respective NC-PS mode.

Referring now to FIG. 6, a NC-PS mode transition diagram is shown in accordance with another exemplary embodiment of the present invention, the connection being selectively operable in the active, standby, hibernate and disconnect modes. As shown, in addition to the mode transitions described above with respect to the exemplary embodiment of FIG. 4, the connection can transition from an active mode to a hibernate mode ($TR_{AH}$), or from a standby mode to a hibernate mode ($TR_{SH}$). Typically, the terminal (or more typically the link manager of the terminal) determines when to transition the connection from either active mode or the standby mode to the hibernate mode, such as in any of a number of different manners. For example, the terminal can determine to transition the connection from either the active mode or the standby mode to the hibernate mode based upon terminal user and/or access point user action, an inactivity timer, and/or higher layer (e.g., UPnP) applications.

As also shown, the connection can transition from a hibernate mode to a disconnected mode or state ($TR_{HD}$), or from a hibernate mode to an active mode ($TR_{HA}$). As the terminal 12 and NCF 14a of a respective access point 14 do not typically have a connection (e.g., BNEP/L2CAP/ACL connection) therebetween in the hibernate mode, either the terminal (or link manager) or the NCF can determine when to transition the connection from the hibernate mode to either the disconnected mode or the active mode, such as in any of a number of different manners. In addition, a connection in the hibernate mode can transition to the same mode or otherwise remain in the same mode ($TR_{HH}$), with the terminal typically determining how long the connection remains in the hibernate mode. In this regard, the terminal can determine how long the connection remains in the same NC-PS mode in any of a number of different manners, such as based upon terminal user action, one or more timers (e.g., inactivity timer, minimum and/or maximum time in a given mode, etc.), and/or higher layer (e.g., UPnP) applications.

When transitioning from the hibernate mode to the disconnected mode ($TR_{HD}$), for example, the terminal and/or NCF may maintain a maximum timer the expiration of which triggers the respective entities to cease activity related to maintaining the connection in the hibernate mode. If only one of the two entities maintains such a maximum timer and accordingly ceases activity related to maintaining the connection in the hibernate mode, the other entity may thereafter attempt to connect to the departed entity in an effort to transition to the active state. The respective entity will typically fail to transition from hibernate to active, and upon such failure, also cease activity related to maintaining the connection in the hibernate mode. When transitioning from the hibernate mode to the active mode ($TR_{HA}$), on the other hand, the entity desiring the transition can reinitiate connection with the other entity, such as by entering the page mode to initiate a BNEP/L2CAP/ACL connection in the case of a Bluetooth bearer.

Reference is now drawn to FIGS. 7a, 7b and 7c, which illustrates various steps in a method of managing a wireless connection with a mobile terminal 12, in accordance with another exemplary embodiment of the present invention, the connection being selectively operable in the active, standby, hibernate and disconnect modes. Similar to the exemplary embodiment of FIG. 5, the method can include establishing an active connection between the mobile terminal and an access point 14, or more particularly the NCF 14a of the access point, such as by means including the NCF performing inquiry and page scanning to receive respective messages from a terminal, and thereafter operating the connection therebetween in the active mode, as shown in blocks 60 and 62. As the connection is operated in the active mode, the terminal, or more particularly the link manager of the terminal, may be triggered to maintain the connection in the active mode or place the connection in either the standby mode or the hibernate mode, or the link manager and/or NCF may be triggered to place the connection in the disconnected mode or state, as shown in blocks 64, 65 and 66. As indicated above, the link manager and/or NCF can be triggered in any of a number of different manners, such as based upon terminal user and/or access point user action, an inactivity timer, and/or higher layer (e.g., UPnP) applications.

As before, if the terminal 12 and/or NCF 14a are triggered to transition the connection from the active mode to the disconnected mode or state, the respective entity can disconnect, terminate or otherwise tear down the connection between the terminal and the NCF, as shown in block 82. In such instances, the connection can be returned to the active mode by re-establishing the connection between the mobile terminal and the NCF (see block 60). If, on the other hand, the link manager is triggered to transition the connection from the active mode to the standby mode, the link manager can place the terminal in a first power-saving mode of the bearer of the connection, such as in either the sniff mode or hold mode in the case of a Bluetooth bearer, as explained above and shown in block 68 of FIG. 7b. Also as the link manager places the mobile terminal 12 in the first power-saving mode of the connection bearer, the link manager can notify the NCF 14a of the transition from the active mode to the standby mode, thereby directing the NCF to operate to reduce traffic to the terminal. Before the NCF reduces traffic to the terminal, however, the NCF can select, or receive a selection of, one or more techniques by which the NCF is to reduce traffic to the terminal, and thereafter accordingly reduce traffic in accordance with the selected technique(s), as shown in blocks 70 and 72. The connection can then be operated in the standby mode, with the terminal operating a first power-saving mode of the connection bearer (e.g., maintaining the terminal in the sniff mode, or periodically placing the terminal in the hold mode), and the NCF reducing traffic to the terminal.

If the link manager of the terminal 12 is triggered to transition the connection from the active mode to the hibernate mode, the link manager can place the terminal in a second power-saving mode of the bearer of the connection, such as by placing the terminal in the park mode or otherwise disconnecting the connection in the case of a Bluetooth bearer, as shown in block 84 of FIG. 7c. In such instances, placing the terminal in the second power-saving mode of the bearer may terminate the connection (e.g., BNEP/L2CAP/ACL connection) between the terminal and the NCF 14a of the respective access point 14. As the link manager places the mobile terminal 12 in the park mode, the link manager sends a link manager protocol (LMP) request, to the NCF 14a, to enter the terminal in the park mode, where the request includes one or more power-saving parameters such as one or more timing parameters. Also as the link manager places the mobile terminal in the second power-saving mode of the connection bearer, the link manager can notify the NCF of the transition from the active mode to the hibernate mode. In the case of a Bluetooth bearer, for example, the NCF can be configured to interpret the park request of the link manager as the link manager transitioning the connection from the active mode to the hibernate mode. In addition to placing the terminal in the park mode, operating the connection in the hibernate mode may include both the link manager and the NCF being configured to perform inquiry and page scanning such that the other entity may be capable of initiating communication therewith by sending respective messages thereto, as opposed to the disconnected mode whereby only the NCF may be so configured. Additionally or alternatively, with the connection in the hibernate mode, the link manager and/or NCF may be configured to maintain one or more parameters (e.g., IP address) required for the terminal to communicate with the network(s) 16 across an active mode connection between the terminal and the NCF, as shown in block 86. In such instances, the NCF may perform ARP proxying on behalf of the terminal to defend the terminal's IP address in the case of an auto-configuration. Alternatively, if the terminal obtained its IP address through DHCP, on the other hand, the link manager may periodically return to the active mode to send a DHCP request to renew its lease on the IP address.

Further, by notifying the NCF 14a of the transition to the hibernate mode, the link manager of the terminal 12 directs the NCF to operate to reduce traffic to the terminal, such as in the same or different manners as in the standby mode. Also similar to the standby mode, before the NCF reduces traffic to the terminal, however, the NCF can select, or receive a selection of, one or more techniques by which the NCF is to reduce traffic to the terminal, and thereafter accordingly reduce traffic in accordance with the selected technique(s), as shown in blocks 88 and 90. The connection can then be operated in the hibernate mode, with the terminal operating a second power-saving mode of the connection bearer (e.g., maintaining the terminal in the park mode or otherwise in a disconnected state), and the NCF reducing traffic to the terminal.

As the connection is operated in the standby mode, the terminal 12, or more particularly the link manager of the terminal, may be triggered to maintain the connection in the standby mode, place the connection in the hibernate mode or return the connection to the active mode, or the link manager and/or NCF may be triggered to place the connection in the disconnected mode or state, such as in any one or more of the manners described above, as shown in blocks 73, 74 and 76 of FIG. 7b. If the mobile terminal and/or NCF are triggered to transition the connection from the standby mode to the disconnected mode or state, however, the respective entity can disconnect, terminate or otherwise tear down the connection between the terminal and the NCF, as again shown in block 82. And as indicated above, the connection can thereafter be returned to the active mode by re-establishing the connection between the mobile terminal and the NCF (see block 60). If the link manager is triggered to transition the connection from the standby mode to the active mode, the link manager can place the terminal in the active mode of the bearer of the connection, such as in a manner similar to that explained above with respect to FIG. 5, as shown in block 78. Then, upon being triggered to place the connection in the active mode, the NCF can cease to reduce traffic to the terminal, as shown in block 80. Then, after the link manager has transitioned the terminal to the active mode, and the NCF has ceased reducing traffic to the terminal, the connection between the terminal and the NCF can again be operated in the active mode, as shown in block 62. The technique can then continue, with the terminal and/or NCF capable of transitioning the connection therebetween between one or more of a number of modes of operation (e.g., active, standby, disconnected).

As the connection is operated in the hibernate mode, the terminal 12, or more particularly the link manager of the terminal, and/or the NCF 14a may be triggered to maintain the connection in the hibernate mode or return the connection to the active mode, or the link manager and/or NCF may be triggered to place the connection in the disconnected mode or state, as shown in blocks 92 and 94 of FIG. 7c. The link manager and/or NCF can then fully disconnect, terminate or otherwise tear down the connection between the terminal and the NCF, as again shown in block 82. In this regard, the link manager and/or NCF can maintain a maximum timer initialized when the connection is placed in the hibernate mode, and reset each instance of placing the connection in a different mode. Thus, if the connection is maintained in the hibernate mode for a period of time such that the maximum timer expires, the timer expiration can trigger the link manager and/or NCF maintaining the timer to cease activity related to maintaining the connection in the hibernate mode. For example, the link manager and/or NCF may cease maintaining one or more parameters (e.g., IP address) required for the terminal to communicate with the network(s) 16 across an active mode connection between the terminal and the NCF. In such instances, if only one of the link manager and NCF maintains such a maximum timer and accordingly ceases activity related to maintaining the connection in the hibernate mode, the other entity may thereafter attempt to connect to the departed entity in an effort to transition to the active state. The respective entity will typically fail to transition from hibernate to active, and upon such failure, also cease activity related to maintaining the connection in the hibernate mode. Irrespective of how the connection is transitioned from the hibernate mode to the disconnected mode, the connection can thereafter be returned to the active mode with either the terminal or the NCF re-initiating the connection between the terminal and the NCF such that the connection can thereafter be re-established (see block 60).

If the terminal 12 (or link manager) or NCF 14a is triggered to transition the connection from the hibernate mode to the active mode, the link manager can place the terminal in the active mode of the bearer of the connection, as shown in block 96. Thereafter, the NCF can cease to reduce traffic to the terminal, as shown in block 98. Similar to transitioning from the disconnected mode to the active mode, to transition from the hibernate mode to the active mode, the connection between the terminal and the NCF can be re-established. In contrast to transitioning the connection from the disconnected mode to the active mode, transitioning the connection from the hibernate mode to the active mode may include either the terminal or the NCF initiating the connection. In addition, when transitioning from the hibernate mode to the active mode, the connection may be re-established for the terminal to communicate with the network(s) across the active mode connection without re-establishing the parameters required for such communication, as may be required when transitioning from the disconnected mode to the active mode.

To further illustrate the benefits of exemplary embodiments of the present invention, consider a user who used a mobile telephone (i.e., mobile terminal 12) to control a DLNA-compliant static media server 18 on a home LAN (i.e., network 16) via a wireless access point 14. Also consider that, after the user finished controlling the media server, the user left the telephone on a table without first properly disconnecting from the access point or "logging-out." Conventionally, the user may expect the mobile telephone will discharge power significantly faster because the user did not follow the proper procedure to permit the telephone to power down.

In accordance with exemplary embodiments of the present invention, the mobile telephone (i.e., mobile terminal 12) can be configured to trigger a link manager of the telephone to transition the connection with the NCF 14a of the access point from the active mode to the standby mode after five minutes of user inactivity. The transition, then, can be effectuated by sending a Bluetooth LMP request to place the telephone in the Bluetooth sniff mode with a sniff interval of 0.5 seconds, for example. The NCF can accept the request, and thereafter prepare to start performing ARP proxying after the transition to the NC-PS standby mode is complete. Thus, after the connection enters the NC-PS standby mode, the mobile telephone can still receive traffic from the home network, but the NCF reduces the traffic reaching the mobile terminal by performing ARP proxying on behalf of the telephone.

After five more minutes of user inactivity, presume the mobile telephone (i.e., mobile terminal 12) is triggered to maintain the connection in the standby mode, but increase the power savings by placing the telephone in the Bluetooth sniff mode with an increased sniff interval of two seconds. Also, presume that the NCF is configured to also start multicast traffic filtering if the requested sniff interval is above one second. In such an instance, because the connection is in the NC-PS standby mode and the sniff interval is above one second, the mobile telephone can still receive traffic from the rest of the network, but the NCF reduces the traffic reaching the mobile terminal by performing ARP proxying and also multicast filtering. If any user activity occurred at this point, the mobile telephone could send an LMP unsniff request to cancel the Bluetooth sniff mode and place the telephone back in the active mode, without much user perceived delay. Presuming no user activity occurs, however, the mobile telephone can be configured (e.g., by the user via a configuration menu presented by the link manager) such that, after ten minutes of inactivity, the telephone terminates the connection with the access point 14 or otherwise disconnects from the access point, and powers down its Bluetooth interface. Thus, when the user returns to the mobile telephone, the user can again communicate with the media server by reconnecting to the home network to access the respective media server.

According to one aspect of the present invention, the functions performed by one or more of the entities of the system 10, such as the terminal 12 and/or access point 14, including the NCF 14a, may be performed by various means, such as hardware and/or firmware, including those described above, alone and/or under control of a computer program product (e.g., link manager, etc.). The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 5, and FIGS. 7a, 7b and 7c, are flowcharts of methods, systems and program products according to the invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor; and
   a memory storing computer program code, the memory and computer program code configured to, with the processor, cause the apparatus to at least perform or cause performance of the following:
   supporting operation of a wireless connection between the apparatus and an access point in an active mode, the access point being coupled to a network;
   transitioning the connection from the active mode to a network-connectivity power-saving (NC-PS) mode, wherein transitioning the connection comprises:
      entering the apparatus in a power-saving mode of a bearer of the connection; and
      directing the access point to reduce traffic flowing from the network across the connection to the apparatus when the apparatus is otherwise capable of receiving the traffic from the access point, wherein directing the access point to reduce traffic includes directing the access point to reduce a quantity of traffic.

2. An apparatus according to claim 1, wherein directing the access point to reduce traffic comprises notifying the access point of the apparatus entering the power-saving mode to thereby direct the access point to reduce traffic.

3. An apparatus according to claim 1, wherein directing the access point to reduce traffic comprises requesting that the access point enter the apparatus in the power-saving mode to thereby direct the access point to reduce traffic.

4. An apparatus according to claim 1, wherein directing the access point to reduce traffic comprises directing the access point to select at least one power-saving technique, and thereafter reduce traffic in accordance with the selected at least one power-saving technique.

5. An apparatus according to claim 4, wherein directing the access point to reduce traffic comprises directing the access point to select at least one power-saving technique based upon at least one power-saving parameter, the selected at least one power-saving parameter being received by the access point in a request to enter the apparatus in the power-saving mode.

6. An apparatus according to claim 1, wherein directing the access point to reduce traffic comprises directing the access point to reduce traffic by preventing at least one type of network traffic from flowing to the apparatus, the at least one type of network traffic prevented from flowing to the apparatus including at least one of multicast traffic, broadcast traffic, address resolution traffic or group management traffic.

7. An apparatus according to claim 1, wherein the NC-PS mode comprises a hibernate mode, and wherein transitioning the connection further comprises:
   terminating the connection between the apparatus and the access point, the connection being terminated while maintaining at least one network parameter for the apparatus to receive traffic from the network across the connection.

8. An apparatus according to claim 1, wherein directing the access point to reduce traffic comprises directing the access point to reduce, but not eliminate, traffic flowing from the network across the connection to the apparatus while the apparatus in the power-saving mode remains configured to receive the traffic from the access point.

9. An apparatus comprising:
   a first means for operating supporting operation of a wireless connection between the apparatus and an access point in an active mode, the access point being coupled to a network; and
   a second means for transitioning the connection from the active mode to a network-connectivity power-saving (NC-PS) mode, wherein the second means is configured to transition the connection by entering the apparatus in a power-saving mode of a bearer of the connection, and direct the access point to reduce traffic flowing from the network across the connection to the apparatus when the apparatus is otherwise capable of receiving the traffic from the access point, wherein the second means being configured to direct the access point to reduce traffic includes being configured to direct the access point to reduce a quantity of traffic.

10. An apparatus according to claim 9, wherein the second means is configured to notify the access point of the apparatus entering the power-saving mode to thereby direct the access point to reduce traffic.

11. An apparatus according to claim 9, wherein the second means is configured to request that the access point enter the apparatus in the power-saving mode to thereby direct the access point to reduce traffic.

12. An apparatus according to claim 9, wherein the second means is configured to direct the access point to reduce traffic such that the access point selects at least one power-saving technique, and thereafter reduces traffic in accordance with the selected at least one power-saving technique.

13. An apparatus according to claim 12, wherein the second means is configured to direct the access point to reduce traffic such that the access point selects at least one power-saving technique based upon at least one power-saving parameter, the selected at least one power-saving parameter being received by the access point in a request to enter the apparatus in the power-saving mode.

14. An apparatus according to claim 9, wherein the second means is configured to direct the access point to reduce traffic such that the access point reduces traffic by preventing at least one type of network traffic from flowing to the apparatus, the at least one type of network traffic prevented from flowing to the apparatus including at least one of multicast traffic, broadcast traffic, address resolution traffic or group management traffic.

15. An apparatus according to claim 9, wherein the NC-PS mode comprises a hibernate mode, and wherein the second means is configured to transition the connection by further terminating the connection between the apparatus and the access point, the connection being terminated while maintaining at least one network parameter for the apparatus to receive traffic from the network across the connection.

16. An apparatus according to claim 9, wherein the second means being configured to direct the access point to reduce traffic includes being configured to direct the access point to reduce, but not eliminate, traffic flowing from the network across the connection to the apparatus while the apparatus in the power-saving mode remains configured to receive the traffic from the access point.

17. An apparatus comprising:
a processor; and
a memory storing computer program code, the memory and computer program code configured to, with the processor, cause the apparatus to at least perform or cause performance of the following:
supporting operation of a wireless connection between the apparatus and another apparatus in an active mode, the apparatus being coupled to a network;
receiving direction to reduce traffic flowing from the network across the connection to the other apparatus when the other apparatus is otherwise capable of receiving traffic from the apparatus; and
reducing traffic flowing from the network,
wherein receiving direction to reduce traffic comprises receiving direction to reduce a quantity of traffic in conjunction with the other apparatus transitioning the connection from the active mode to a network-connectivity power-saving (NC-PS) mode, transitioning the other apparatus also including entering the other apparatus in a power-saving mode of a bearer of the connection.

18. An apparatus according to claim 17, wherein receiving direction to reduce traffic comprises receiving notification of the other apparatus entering the power-saving mode to thereby receive direction to reduce traffic.

19. An apparatus according to claim 17, wherein receiving direction to reduce traffic comprises receiving a request to enter the other apparatus in the power-saving mode to thereby receive direction to reduce traffic.

20. An apparatus according to claim 17, wherein the memory and computer program code are further configured to, with the processor, cause the apparatus to further perform the following:
selecting at least one power-saving technique, wherein reducing traffic comprises reducing traffic in accordance with the selected at least one power-saving technique.

21. An apparatus according to claim 20, wherein selecting at least one power-saving technique comprises selecting at least one power-saving technique based upon at least one power-saving parameter, the selected at least one power-saving parameter being received by the apparatus in a request to enter the other apparatus in the power-saving mode.

22. An apparatus according to claim 17, wherein reducing traffic comprises reducing traffic by preventing at least one type of network traffic from flowing to the other apparatus, the at least one type of network traffic prevented from flowing to the other apparatus including at least one of multicast traffic, broadcast traffic, address resolution traffic or group management traffic.

23. An apparatus according to claim 17, wherein the NC-PS mode comprises a hibernate mode, and wherein the memory and computer program code are further configured to, with the processor, cause the apparatus to further perform the following:
terminating the connection with the other apparatus in conjunction with the other apparatus transitioning the connection from the active mode to the NC-PS mode, the connection being terminated while at least one network parameter for the other apparatus to receive traffic from the network across the connection is maintained.

24. An apparatus according to claim 17, wherein receiving direction to reduce traffic comprises receiving direction to reduce, but not eliminate, traffic flowing from the network across the connection to the other apparatus while the other apparatus in the power-saving mode remains configured to receive the traffic from the apparatus.

25. A method comprising performing or causing performance of at least the following:
supporting operation of a wireless connection between an apparatus and an access point in an active mode, the access point being coupled to a network; and
transitioning the connection from the active mode to a network-connectivity power-saving (NC-PS) mode, wherein transitioning the connection comprises:
entering the apparatus in a power-saving mode of a bearer of the connection; and
directing the access point to reduce traffic flowing from the network across the connection to the apparatus when the apparatus is otherwise capable of receiving the traffic from the access point, wherein directing the access point to reduce traffic includes directing the access point to reduce a quantity of traffic.

26. A method according to claim 25, wherein directing the access point to reduce traffic comprises notifying the access point of the apparatus entering the power-saving mode to thereby direct the access point to reduce traffic.

27. A method according to claim 25, wherein directing the access point to reduce traffic comprises requesting that the access point enter the apparatus in the power-saving mode to thereby direct the access point to reduce traffic.

28. A method according to claim 25, wherein directing the access point to reduce traffic comprises directing the access point to select at least one power-saving technique, and thereafter reduce traffic in accordance with the selected at least one power-saving technique.

29. A method according to claim 28, wherein directing the access point to reduce traffic comprises directing the access point to select at least one power-saving technique based upon at least one power-saving parameter, the selected at least one power-saving parameter being received by the access point in a request to enter the apparatus in the power-saving mode.

30. A method according to claim 25, wherein directing the access point to reduce traffic comprises directing the access point to reduce traffic by preventing at least one type of network traffic from flowing to the apparatus, the at least one type of network traffic prevented from flowing to the apparatus including at least one of multicast traffic, broadcast traffic, address resolution traffic or group management traffic.

31. A method according to claim 25, wherein the NC-PS mode comprises a hibernate mode, and wherein transitioning the connection further comprises:
    terminating the connection between the apparatus and the access point, the connection being terminated while maintaining at least one network parameter for the apparatus to receive traffic from the network across the connection.

32. A method according to claim 25, wherein directing the access point to reduce traffic comprises directing the access point to reduce, but not eliminate, traffic flowing from the network across the connection to the apparatus while the apparatus in the power-saving mode remains configured to receive the traffic from the access point.

33. A method comprising performing or causing performance of at least the following:
    supporting operation of a wireless connection between an apparatus and an access point in an active mode, the access point being coupled to a network;
    receiving direction to reduce traffic flowing from the network across the connection to the apparatus when the apparatus is otherwise capable of receiving traffic from the access point; and
    reducing traffic flowing from the network,
    wherein receiving direction to reduce traffic comprises receiving direction to reduce a quantity of traffic in conjunction with the apparatus transitioning the connection from the active mode to a network-connectivity power-saving (NC-PS) mode, transitioning the apparatus also including entering the apparatus in a power-saving mode of a bearer of the connection.

34. A method according to claim 33, wherein receiving direction to reduce traffic comprises receiving notification of the apparatus entering the power-saving mode to thereby receive direction to reduce traffic.

35. A method according to claim 33, wherein receiving direction to reduce traffic comprises receiving a request to enter the apparatus in the power-saving mode to thereby receive direction to reduce traffic.

36. A method according to claim 33 further comprising:
    selecting at least one power-saving technique, wherein reducing traffic comprises reducing traffic in accordance with the selected at least one power-saving technique.

37. A method according to claim 36, wherein selecting at least one power-saving technique comprises selecting at least one power-saving technique based upon at least one power-saving parameter, the selected at least one power-saving parameter being received by the access point in a request to enter the apparatus in the power-saving mode.

38. A method according to claim 33, wherein reducing traffic comprises reducing traffic by preventing at least one type of network traffic from flowing to the apparatus, the at least one type of network traffic prevented from flowing to the apparatus including at least one of multicast traffic, broadcast traffic, address resolution traffic or group management traffic.

39. A method according to claim 33, wherein the NC-PS mode comprises a hibernate mode, and wherein the method further comprises terminating the connection with the apparatus in conjunction with the apparatus transitioning the connection from the active mode to the NC-PS mode, the connection being terminated while at least one network parameter for the apparatus to receive traffic from the network across the connection is maintained.

40. A method according to claim 33, wherein receiving direction comprises receiving direction to reduce, but not eliminate, traffic flowing from the network across the connection to the apparatus while the apparatus in the power-saving mode remains configured to receive the traffic from the access point.

41. A computer-readable storage medium having computer-readable program code portions stored therein, the computer-readable storage medium and computer-readable program code portions being configured to, with a processor, cause an apparatus to at least perform or cause performance of the following:
    supporting operation of a wireless connection between an apparatus and an access point in an active mode, the access point being coupled to a network; and
    transitioning the connection from the active mode to a network-connectivity power-saving (NC-PS) mode, wherein transitioning the connection comprises:
        entering the apparatus in a power-saving mode of a bearer of the connection; and
        directing the access point to reduce traffic flowing from the network across the connection to the apparatus when the apparatus is otherwise capable of receiving the traffic from the access point, wherein directing the access point to reduce traffic includes directing the access point to reduce a quantity of traffic.

42. A computer-readable storage medium according to claim 41, wherein directing the access point to reduce traffic comprises notifying the access point of the apparatus entering the power-saving mode to thereby direct the access point to reduce traffic.

43. A computer-readable storage medium according to claim 41, wherein directing the access point to reduce traffic comprises requesting that the access point enter the apparatus in the power-saving mode to thereby direct the access point to reduce traffic.

44. A computer-readable storage medium according to claim 41, wherein directing the access point to reduce traffic comprises directing the access point to reduce traffic such that the access point selects at least one power-saving technique, and thereafter reduce traffic in accordance with the selected at least one power-saving technique.

45. A computer-readable storage medium according to claim 44, wherein directing the access point to reduce traffic comprises directing the access point to select at least one power-saving technique based upon at least one power-saving parameter, the selected at least one power-saving parameter being received by the access point in a request to enter the apparatus in the power-saving mode.

46. A computer-readable storage medium according to claim 41, wherein directing the access point to reduce traffic comprises directing the access point to reduce traffic by preventing at least one type of network traffic from flowing to the apparatus, the at least one type of network traffic prevented from flowing to the apparatus including at least one of multicast traffic, broadcast traffic, address resolution traffic or group management traffic.

47. A computer-readable storage medium according to claim 41, wherein the NC-PS mode comprises a hibernate mode, and wherein transitioning the connection further comprises:
    terminating the connection between the apparatus and the access point, the connection being terminated while maintaining at least one network parameter for the apparatus to receive traffic from the network across the connection.

48. A computer-readable storage medium according to claim 41, wherein directing the access point to reduce traffic comprises directing the access point to reduce, but not eliminate, traffic flowing from the network across the connection to the apparatus while the apparatus in the power-saving mode remains configured to receive the traffic from the access point.

* * * * *

UNITED STATES PATENT AND TRADEMARK OFFICE
CERTIFICATE OF CORRECTION

| | | |
|---|---|---|
| PATENT NO. | : 7,764,981 B2 | Page 1 of 1 |
| APPLICATION NO. | : 11/190663 | |
| DATED | : July 27, 2010 | |
| INVENTOR(S) | : Kalofonos et al. | |

It is certified that error appears in the above-identified patent and that said Letters Patent is hereby corrected as shown below:

Column 22,

Line 38, cancel "operating".

Signed and Sealed this
Third Day of January, 2012

David J. Kappos
*Director of the United States Patent and Trademark Office*